United States Patent [19]

Thomas et al.

[11] Patent Number: 4,829,451

[45] Date of Patent: May 9, 1989

[54] COMPUTER FOR SIMULATING COMPLEX PROCESSES

[76] Inventors: Gerhard G. Thomas, Weinmeisterhornweg 80, D-1000 Berlin 20, Fed. Rep. of Germany; Bernhard Mitterauer, Viehhausen 59, A-5071 Wals Bei Salzburg, Austria

[21] Appl. No.: 22,256

[22] Filed: Mar. 5, 1987

[30] Foreign Application Priority Data

Mar. 5, 1986 [DE] Fed. Rep. of Germany ....... 3607241

[51] Int. Cl.[4] .............................................. G06F 15/42

[52] U.S. Cl. .................................................... 364/513

[58] Field of Search ................ 364/132, 131, 133–139, 364/513

[56] References Cited

U.S. PATENT DOCUMENTS 3,473,160 10/1969 Wahlstrom ........................ 340/172.5

4,518,866 5/1985 Clymer ................................ 307/201

4,591,967 5/1986 Mattes et al. ....................... 364/132

FOREIGN PATENT DOCUMENTS 0132926 7/1985 European Pat. Off. .

3429078 4/1987 Fed. Rep. of Germany .

OTHER PUBLICATIONS

Thomas, "On Permutographs," Supplemento ai Rendiconti del Circolo Matematico di Palerma, Serie II/2, 1982.

Moldovan, "An Associative Array Architecture Intended for Semantic Network Processing," Proceedings ACM '84 Annual Conference, the Fifth Generation Challenge, Oct. 1984.

*Primary Examiner*—Allen MacDonald

*Attorney, Agent, or Firm*—Fitch, Even, Tabin & Flannery

[57] ABSTRACT

The invention relates to a computer, in particular for simulating biological processes. The essential feature of the computer is a central logic/computing system which is constructed as an n-valent permutograph. The negation network of this permutograph consists of individual nodal computers which are connected with other nodal computers via information or negation lines. Each nodal computer contains the negation network of the permutograph in a subnodal unit. The total computer can be controlled externally or internally, resulting in an intentional computer.

17 Claims, 7 Drawing Sheets

NODES:
① 1234
② 1243
③ 1324
④ 1342
⑤ 1423
⑥ 1432
⑦ 2134
⑧ 2143
⑨ 2314
⋮
㉔ 4321

① ② ······ ㉔ (NODAL COMPUTERS)

□1 ············ □4 (LAYERS)

22i FIG. 5

COMPUTER FOR SIMULATING COMPLEX PROCESSES

The present invention relates generally to computers, and is more particularly directed to computers for simulating complex processes, such as biological processes and the like.

Conventional digital computers operate altogether and in all their subsystems with a digital, i.e. bivalent, logic whose basic elements are bits with the values zero and one or high and low. The data flow within such classic digital computers—e.g. addresses, commands, functional data, etc.—is composed of data words which are each a sequence of such bits. The higher the storage capacity and computing capacity of such a classic computer are, the more space it requires and the more difficult it is to control and check. Modern maxicomputers comprising a plurality of subcomputers with parallel operation require a great deal of space but still have a capacity limit in terms of storage loctions and computing time which virtually does not allow for the calculation or simulation of complicated, for example biological, processes.

The invention is based on the problem of stating a computer and in general the constructional principle of a computer that requires little space but can be equipped with a much greater number of storage possibilities than conventional computers and which allows for the calculation of complicated processes, in particular self-controlling biological processes.

This problem is solved, according to the invention, by providing a transclassic computer in terms of its construction and functioning. The computer operates with a new logic and, since the total computer is represented in each nodal computer, is capable of hardware self-construction and optionally restructing analogously to the biological system of the brain. It may be termed an intentional computer.

In the inventive computer the modules termed the logic, information pattern, i.e. bit sequence, memory, program commands and programming languages in classic computers are adapted to each other harmoniously to form an integrated whole. In other words, the software, hardware, organizational structure and also the problem analysis as a formal system unite to form a whole. This is achieved by coordinating multivalent logic, qualitative mathematics and cybernetic systems theory. The whole is integrated mainly by the multivalent logic that has been set forth and developed further by G. Günther in Hegel-Jahrbuch 1979, Verlag Pahl-Rugenstein, Cologne, 1980, in the article "Identität, Gegenidentität und Negativsprache" ("Identity, Counteridentity and Negative Language"). The logic is therefore referred to "Günther logic."

The invention provides a compact computer in terms of its material and its possibilities of application to complex systems, which recreates the crosslinking of neurons in the human brain. This computer allows for an enormous widening of the above-mentioned capacity limits of existing computers, including the most modern ones, in terms of computing time and storage locations, thereby combining an "astronomical" number of possibilities of producing information with very short processing times.

The essential feature of the computer structure is the use of a negation network for the logic and computing system, for which $(n-1)$ negators of an n-valent logic are preferably used as the fundamental operation base. A negation network of more, up to $$\binom{n}{2}$$

negators is possible, although it makes the structure more complicated. Further logical operators of the classic and transclassic types can be derived from the negation network. The functional process on which this negation logic is based was described mathematically by G. G. Thomas in the essay "On Permutographs," published in "Supplemento ai Rendiconti del Circolo Matematico di Palmero," Series II/2, 1982, pp. 275–286.

Permutographs are formed of nodes and edges connecting said nodes according to a certain operation scheme, which are represented as nodal computers and information lines in the inventive computer. This network of nodal computers and information lines corresponds to the crosslinking of neurons and dendrites in the brain and forms a complex switching network for n values and data records composed thereof. The individual n values of the total system are termed primitive qualities, i.e. they are various distinct areas of knowledge.

For $n=5$, i.e. for a pentavalent logic, a schematic circuit diagram for a negation network is shown in FIG. 1. $n!=120$ permutations corresponding to logically distinct negation states correspond to the nodal computers shown as circles. The individual permutations are numbered consecutively from 1 to 120, each number representing one of the 120 permutations. For example, permutation (1) stated in the upper layer 1 should be read "1 2 3 4 5". This permutation may be converted into permutation (7) corresponding to "1 3 2 4 5" by applying the negator N2, i.e. by exchanging the values 2 and 3. The negators, i.e. exchange operations of successive numerical values within permutations, are shown in this figure only by the smaller numerical value.

The connections between the n! nodal computers are information lines each having a negator $N_{ij}$ associated therewith in such a way that when this information line is activated the values i and j change their places within the permutation, which is generally referred to as transposition. If the n values form a minimum contexture CT, referred to as a "tree" in graph theory $(n-1)$ negators suffice to construct the network for all n! nodes. This is also utilized for the inventive computer and for the schematic circuit diagram in FIG. 1. The contexture states the permissible exchange conditions for the n values. There are different kinds of contextures, for example, linear and star contextures; cf. "On Permutographs." For example, $N_1$ $N_2$ $N_3$ $N_4$

[1]—[2]—[3]—[4]—[5]

12345 21345 31245 41235 51234 in a LINEAR contexture for five values. The five distinct primitive qualities

[1] to [5]

are combined by four negators, i.e. exchange operators. In the negative computer this means that the primitive qualities are associated with the individual layers so that the nodal computers in the first layer are each connected by information lines to nodal computers in the second layer, the negator $N_1$ being associated with all information lines. Accordingly, negator $N_2$ applies to layers $$\boxed{2} \text{ and } \boxed{3},$$

etc.

This negation network can be used to construct further logical operators. Via the memory structure, i.e. contexture CT, which contains construction rules as to how the n values can be combined, the n! nodes are thus linked to form a negation network. Every permutation of the n values expresses the identity of the particular nodal computer and is at the same time its address. The exchange operation by negators $N_1$, $N_2$, $N_3$ and $N_4$ is shown in FIG. 1 with reference to permutations (1), (25), (49), (73) and (97). The associated permutations 1 2 3 4 5, 2 1 3 4 5, 3 1 2 4 5, 4 1 2 3 5 and 5 1 2 3 4 are added in square brackets. The stated negation network with only four negators is a minimal compound contexture CT with considerable storage and computing capacity.

The computer operates with a negative language. In this language words are formed. A word in the negative language means the performance of a negation sequence NF according to the multivalent-operation negation system of the basic multivalent logic, this negation sequence NF being determined by a sequence of individual negators. The words each corresponding to a negation sequence can only be formed on the negation network. Since the negation system for $n \geqq 4$ forms a cross-linked system of circle, cyclical, e.g. biological, processes can also be described by words.

A path within the negation network of nodal computers and information lines may be a path, a circular path or else a network, maximally the total available negation network. An example in FIG. 1 is circular path (3) (27) (51) (53) (29) (5) (3), which starts a nodal computer 3 and shows negation sequence $N_1$ $N_2$ $N_4$ $N_2$ $N_1$ $N_4$.

The carrier of information is again the negation network formed by the multivalent logic. Instead of resorting to a binary pattern as in classic computers, the information content of a word is determined in the inventive computer by running through a negation sequence in the negation network. This makes it possible, for example, to represent 3750 circular words in merely a tetravalent system with a linear contexture that forms a negation network with 24 nodes; cf. the table in German "offenlegungsschrift" No. 34 29 078. Such a tetravalent system with 24 nodal computers is shown in FIG. 2, the negators being again characterized only by the indices. The network comprises four layers; the linear contexture of the four values $$\boxed{1}\ \boxed{2}\ \boxed{3}\ \boxed{4}$$

is shown on the right beside the four-layer permutography

In a pentavalent system, corresponding to a five-layer permutograph as in FIG. 1, there is a minimum estimate of the number of largest circles which is about $10^8$. Including the possibilities of forming paths and networks, the data memory has a resulting capacity of a size unimaginable up to now while the space required is relatively minimal.

All in all, a computer of extremely compact construction can be provided whose architecture is determined by a three-dimensional layer permutograph.

It can be proven mathematically that each node in an n-valent permutograph can be reached by every other node in a maximum of $$\binom{n}{m} = \frac{n!}{m!(n-m)!} = \binom{n}{n-m}$$

steps. In a heptavalent permutograph with a linear contexture which is a network comprising $7! = 5040$ nodes, the longest of the shortest distances between two of the 5040 nodes is only $$\binom{7}{2} = 21$$

negation steps. This means that extremely short computing times are possible in spite of an immense data memory capacity.

The stated intentional computer according to the invention, or rather its logic and computing system, can be regarded mathematically as a permutograph whose nodes are each in turn constructed as permutographs. This makes self-related control of the computer possible. The individual nodal computers are activated from the outside, e.g. via an input device, but are also controlled internally by other nodal computers and subnodal computers.

The invention shall be described in more detail in an exemplary embodiment with reference to the drawing, in which FIGS. 1 and 2 show already-mentioned schematic views of a pentavalent and tetravalent permutograph constructed in 5 and 4 layers, respectively;

Figure 3:
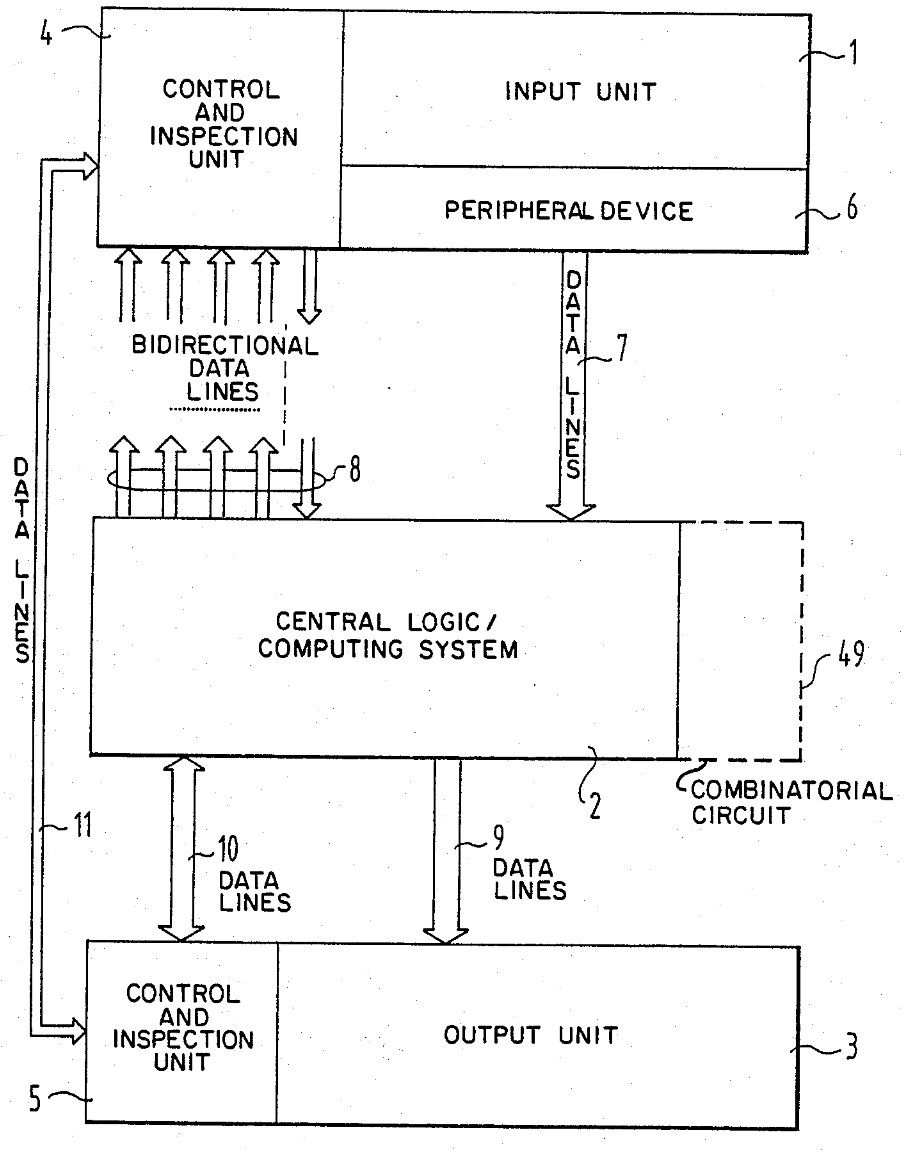
FIG. 3 shows a schematic circuit diagram of an inventively constructured computer.

A total computer as in FIG. 3 has an input unit 1, a central logic/computing system 2 and an output unit 3. In the input unit the data fed to the computer are prepared and transmitted to a peripheral device 6 where they are inputted via a data line 7 into central logic/computing system 2. Between control and inspection unit 4 and central logic/computing system 2 there is a great number of bidirectional data lines which are referred to here as a whole by 8. Via these data lines, clock or other control pulses run from control and inspection unit 4 to central logic/computing system 2 and acknowledgements from central logic/computing system 2 to control and inspection unit 4. The output data of central logic/computing system 2 are fed to output unit 3 via a data line 9. Functional data necessary for the operation of the total computer are exchanged via a bidirectional data line 10 to logic/computing system 2 and control and inspection unit 5 and a bidirectional data line 11 between the two control and inspection units 4 and 5.

Figure 2:
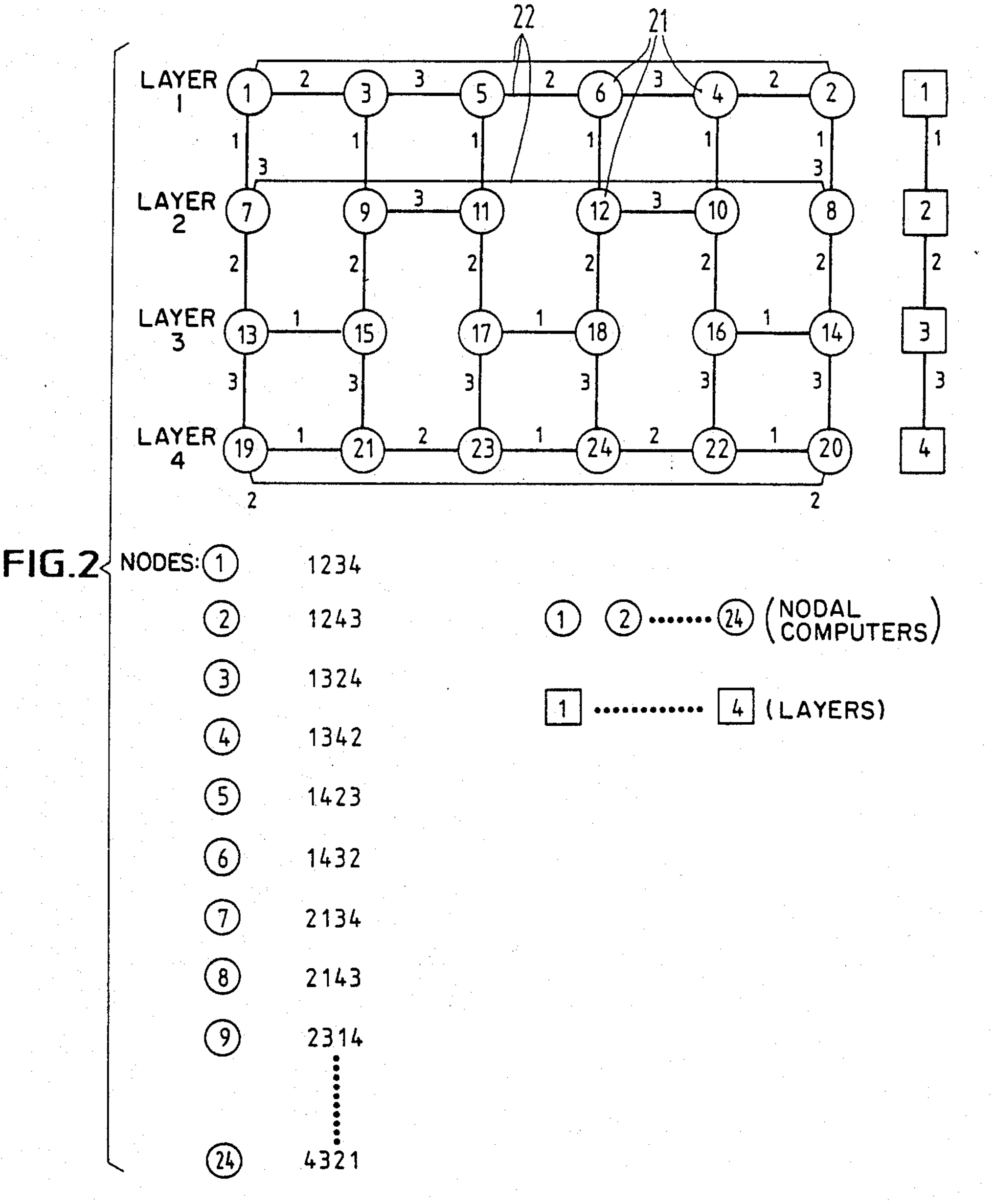
Figure 4:
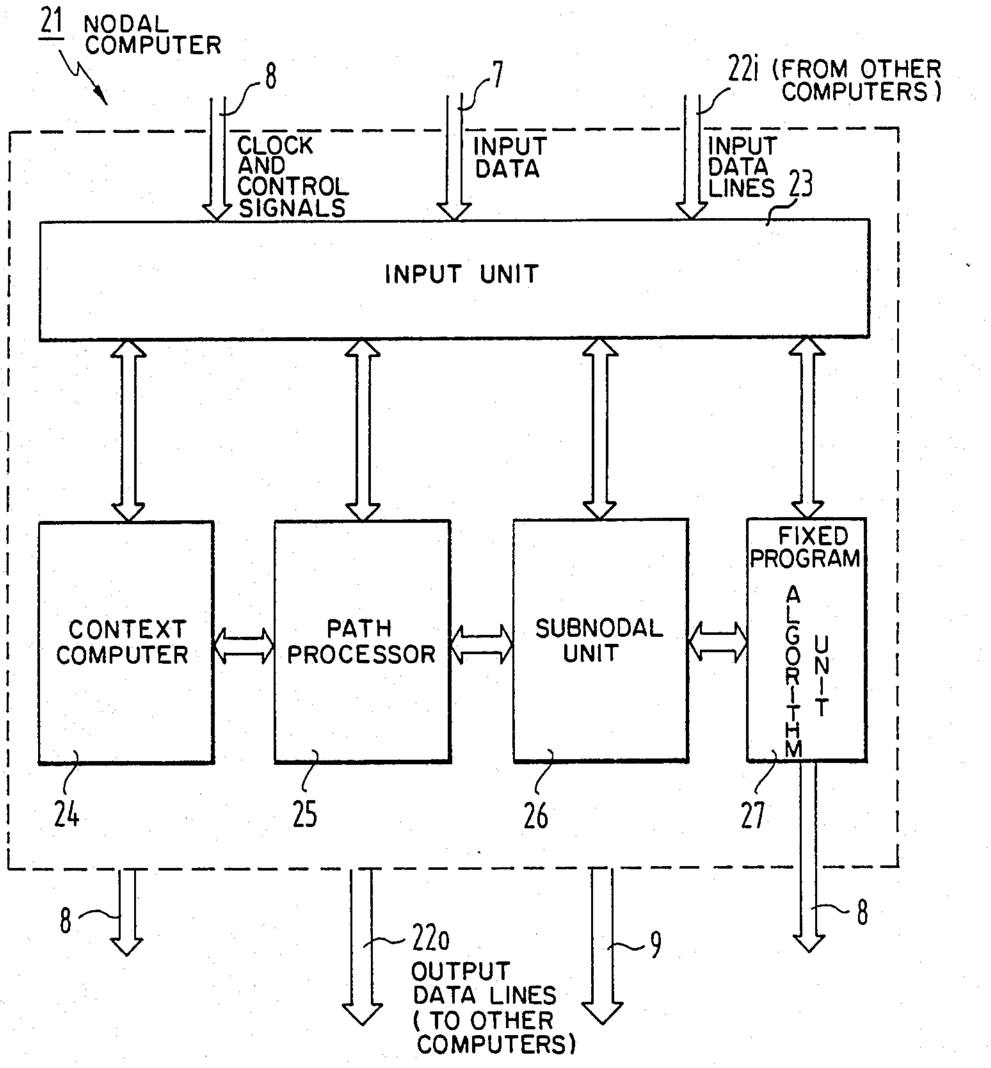
FIG. 4 shows a block diagram of a nodal computer used in the logic and computing system of the total computer.

Central logic/computing system 2 is constructed as an n-valent permutograph. For the sake of simplicity let us assume a tetravalent permutograph according to FIG. 2 with four layers. Logic/computing system 2 thus comprises 24 nodal computers 21, which are shown in FIG. 2 by the circles. Nodal computers 21 are interconnected by information lines 22 according to the scheme stated above. These information lines are bidirectional data lines and thus serve as input and output lines which are divided according to FIG. 4 into two lines **22*i* for the input lines and 22*o*** for the output lines.

Each nodal computer 21 has an input unit 23 with computer control, to which data are inputted via data line 7 from the input unit and via data line **22*i* from other nodal computers. The above-mentioned clock and control signals are fed via line 8. Input unit 23 is connected to a contexture computer 24, a path processor 25, a subnodal unit 26 and a fixed-programmed algorithm unit 27**.

The 24 nodal computers 21 of logic/computing system 2 disposed in four layers form the computer skeleton. In each of the four layers there are six nodes. Each layer is organized in such a way as to keep exactly one of the four values or primitive qualities constant. Each nodal computer is a chip built as a module. This module is a computer built for special purposes which also contains the crosslinking structure of the total computer in subnodal unit 26. In each of the 24 nodal computers 21 special algorithms are provided as hardware or else software in algorithm unit 27 and constitute what is individual in each nodal computer. The crosslinking of the 24 permutations both in the total computer and in each nodal computer 21 to form the negation network as in FIG. 2, i.e. logic/computing system 2, is established by the initial loading of a nodal computer to be termed the first cell, as explained below. Since each chip of each nodal computer has the same structure, apart from the special algorithms stored in unit 27, every nodal computer can in principle become the first cell and temporarily assume the command control of the total computer for special tasks, i.e. there is a redundancy of potential command. Each of the 24 nodes has an intrinsic permutation $P_E=$ $$p_1^e, p_2^e, p_3^e, p_4^e.$$

associated therewith. Some of the altogether 24 permutations are listed in FIG. 2. This intrinsic permutation serves as the address of a certain nodal computer. Thus, the address of the nodal computer shown in FIG. 2 as (1) is (1, 2, 3, 4) and that of the nodal computer shown in FIG. 2 as (8) is (2, 1, 4, 3).

Contexture computer 24 has as its essential component an n-location memory cell 28, in this case with four locations, each having one of the n values associated therewith. This is indicated here by blocks

[1] [2] [3] [4].

The four storage locations are interconnected by a controllable exchange line 29 via which the permissible exchange relations between values 1, 2, 3, 4 are formed. Individual exchange lines 29 may be switched on or off. From each storage location an output line 30 leads to an output control means 31 in which the above-mentioned exchange relations are then formed definitively. Thus, every contexture can be represented, even those which are not related logically.

Three negation lines 32 on which the above-mentioned negators $N_1$, $N_2$ and $N_3$ can be represented lead away from output control means 31. Each negation line 32 is provided with a threshold indicator 33 and a line switch 34 controlled thereby. When a line switch is closed, information, e.g. permutations or negator sequences, can be passed on to a further nodal computer to which the associated output line 32 leads. When the line switch is open, no information can be passed on via the associated output line. The state of the line switch depends on the threshold indicator. These threshold indicators indicate thresholds for the (in this case) three connecting lines of the nodal computer to other nodal computers. Threshold indicators 33 are step counters which count steps of a negation sequence NF moduluo $$\binom{n}{2}$$

The moment a piece of information is sent via a negation line 32, this means that negation $N_1$, $N_2$ or $N_3$ of a certain negation sequence has been performed. The corresponding line switch 34 is then set to "off". Also, the associated threshold indicator 33 is set to "1". The threshold indicator then continues counting in integers in the cycle of the negation sequence taking place in the total computer. A cycle in the total system is independent of the physical time that lapses. It depends solely on a negation having been performed. To make this apparent, this cycle is acknowledged via lines 8 at the end of a negation; since each target is reached in a maximum of $$\binom{n}{2}$$

steps, it suffices for the step counters in threshold indicators 33 to be able to count up to $$\binom{n}{2}$$

i.e. up to 6 in the tetravalent logic system shown here in a simplified form. When the target is reached the step counter stops at the number of steps required therefor, until it is reactivated and starts again at "1".

Path processor 25 intervenes in the particular state of the negation lines. This path processor 25 has step memory 35 containing the algorithm of the shortest path for certain processes within the computer. This algorithm can be switched by the hardware or be calculated in each case. Furthermore, a target memory 36 is provided in which an n-digit vector $P_z=\{P_1^z, P_2^z, P_3^z, P_4^z\}$ is stored, i.e. a target permutation for target-seeking processes. A path length counter 37 is also provided which states the number of steps required for the shortest paths between the particular nodal computer and the nodal computer aimed at as the target. The number of steps is in any case smaller than or equal to n!, in this case smaller than or equal to 24.

These three blocks 35, 36, and 37 communicate with a negation sequence computer 38 which calculates those negation lines 32 with the associated negators which are necessary for reaching the target. The output signal of negation sequence computer 38 is reported to a line switch activator 39 which closes corresponding line switches 34 via a bidirectional data line 40. In certain cases it is possible for a target to be reached on several paths, so that the negation computer accordingly states a plurality of possibilities as to which negation line should be activated. In order for a clear choice to be made, the particular counter readings of the individual step counters in threshold indicators 33 are reported to path processor 25 via bidirectional data line 40. These individual counter readings are stored in a maximum counter 41 whose output signal is also connected with line switch activator 39. Accordingly, if there are several possibilities, that negation line is activated in which the step counter with the highest counter reading is located and whose line switch 34 can be set to "on". Step memory 35 with the stored or calculated algorithm for the shortest path accesses maximum counter 41.

Path processor 25 also contains a comparator circuit 42 that ascertains whether the target has already been reached. This is effected by comparison of the intrinsic permutation serving as the address and the reported target permutation. Independently thereof, path length counter 37 also ascertains whether the target has been reached or a predetermined negation sequence run through, or the transmission of a negation sequence is complete. Corresponding acknowledgements are passed on via data lines 8.

Figure 5:
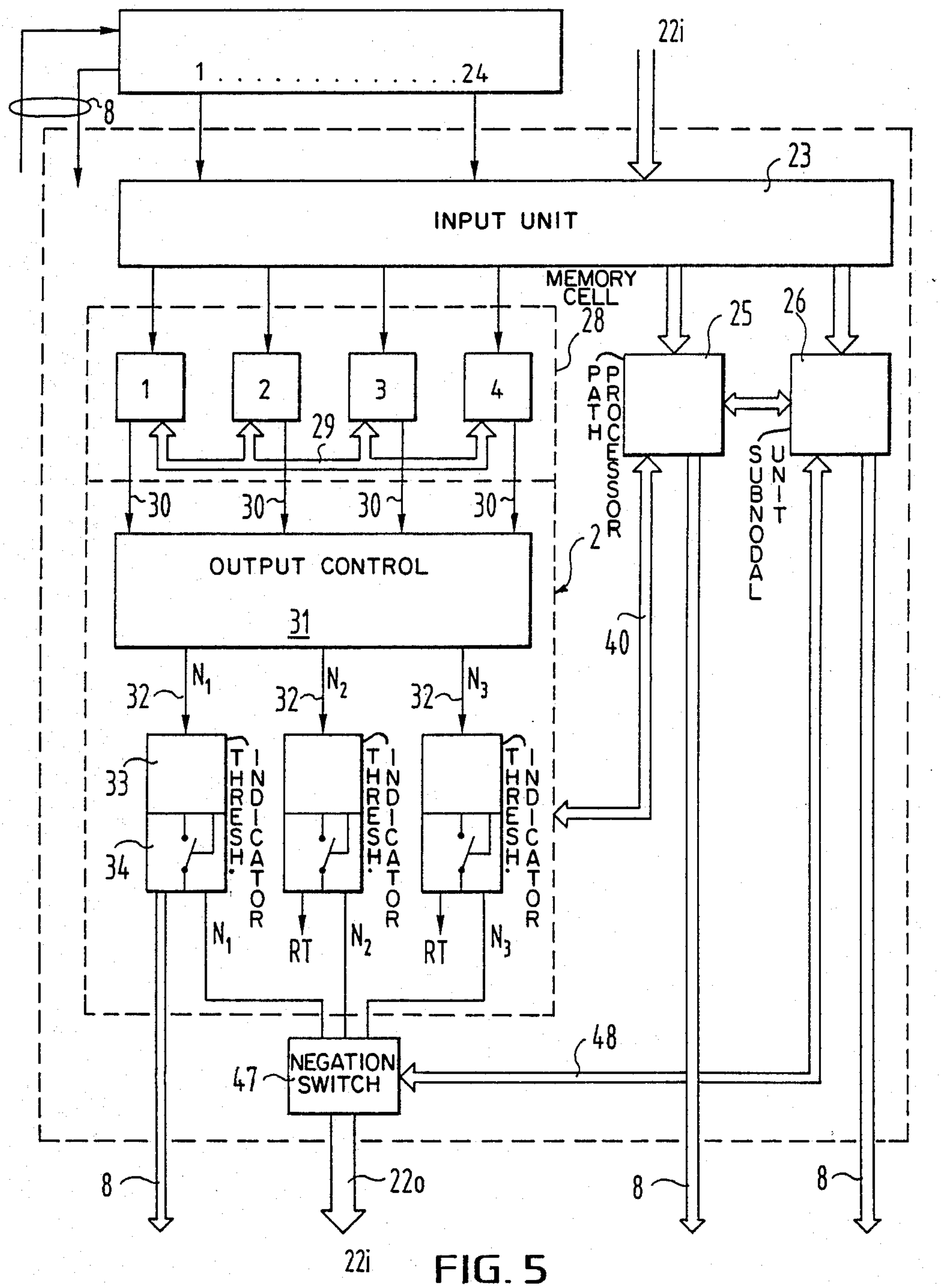
FIG. 5 shows a detail block diagram of a nodal computer with a contexture computer, a path processor and a subnodal unit.
Figure 6:
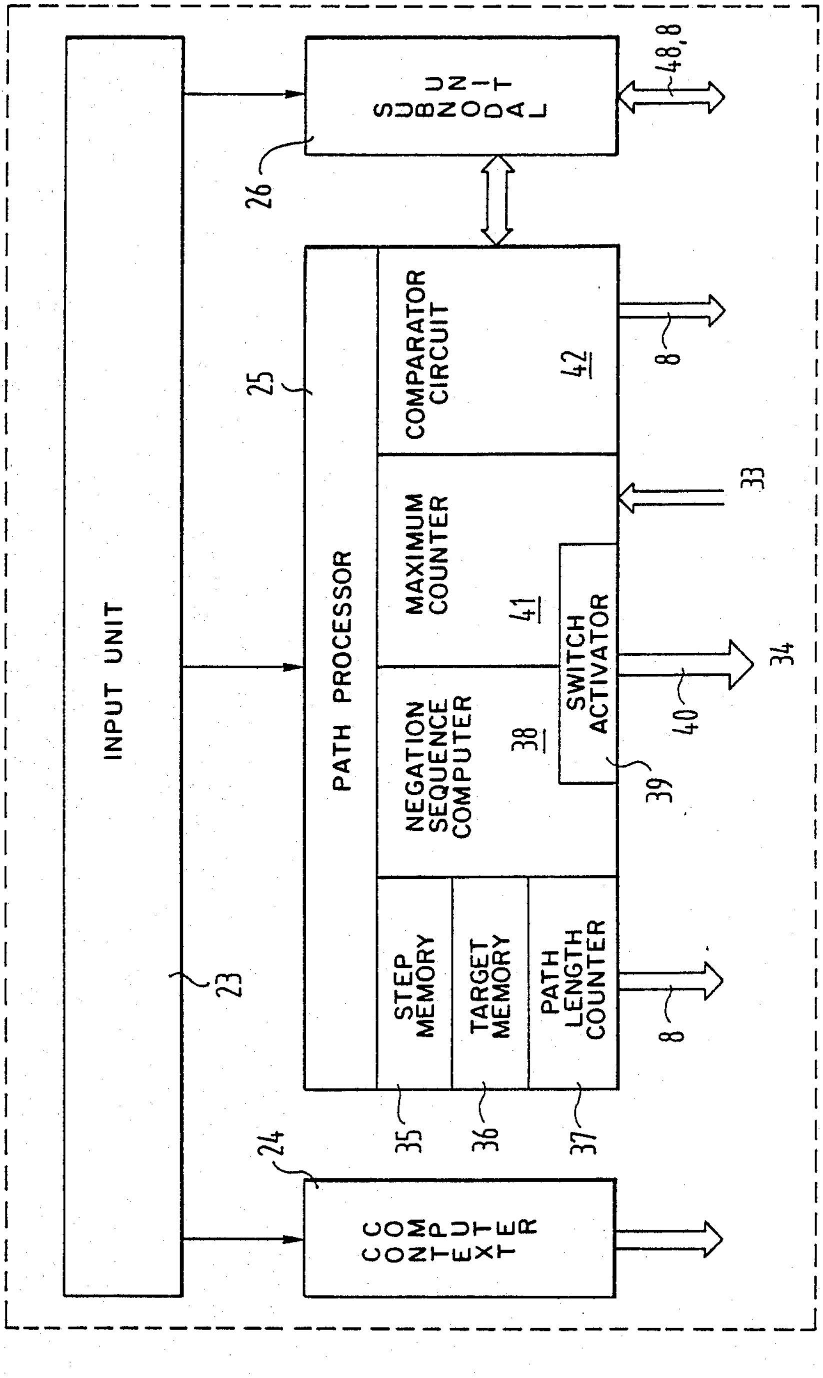
FIG. 6 shows a block diagram of the path processor.
Figure 7:
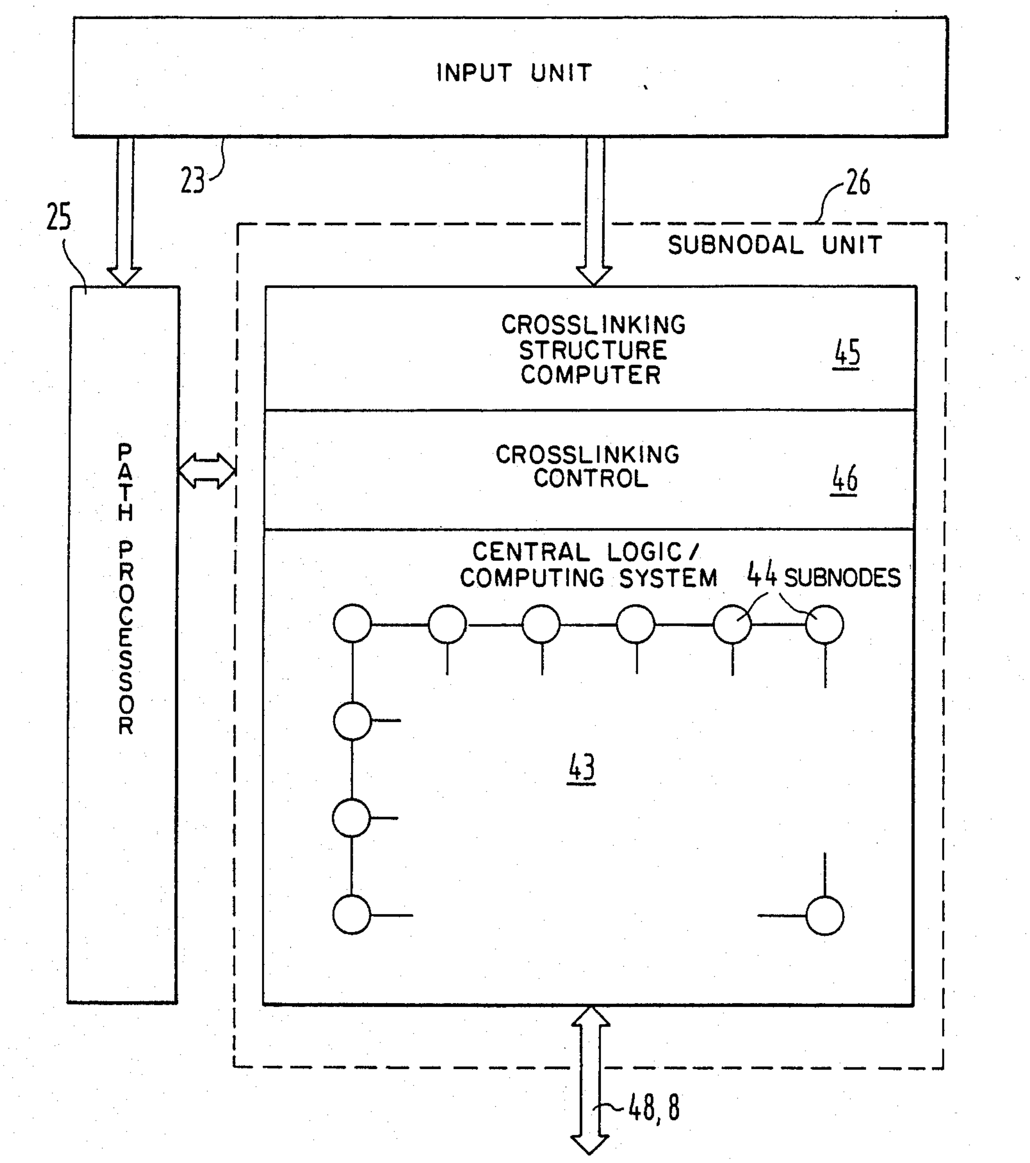
FIG. 7 shows a block diagram of the subnodal unit.

In the case of a disturbance a target may be reached by a detour. In this case path length counter 37 of the particular nodal computer naturally exceeds the calculated minimum length or the predetermined original length before the target is reached. It is possible to detect a disturbance and reach the target by a detour due to subnodal unit 26 provided in each nodal computer, which is in turn a replica of the total computer, thus an n-valent, i.e. in this case a tetravalent, permutograph. Subnodal unit 26 thus has a central logic/computing system 43 comprising 24 subnodes 44 which are interconnected. The type of connection between the individual subnodes is fixed in a crosslinking structure computer 45; the particular crosslinking is activated by a crosslinking control means 46. Subnodal unit 26 can intervene in the path processor or else directly in negation lines 32. For this purpose, a negation switch 47 is provided in negation lines 32 of each nodal computer, said switch communicating with subnodal unit 26 via a bidirectional data line 48 (FIG. 5).

Since each nodal computer also contains the total computer network in subnodal unit 26, there is a possibility, if necessary, of a certain nodal computer—which can in principle be any nodal computer—assuming control functions and jointly computing itself. The nodal computer serves in this case as a reference computer.

In algorithm unit 27 present in each nodal computer, further algorithms are stored or are calculated as required, for example the algorithm "check the operability of each nodal computer and report back to the initial nodal computer" or "run through all n! nodal computers without returning." These algorithms generate certain negative language words, i.e. negation sequences. These calculated or firmly stored negation sequences are sent to the specific nodal computers via negation lines 32. Since a nodal computer must know in each case whether the incoming piece of information is a permutation P or a negation sequence, each permutation is always preceded by an indicator sign distinct from the n values.

The three-dimensional permutograph skeleton of an n-valent permutograph must of course be calculated. It results from the mathematical theory for permutographs that a permutograph for an n-valent system contains its greatest symmetry and shortest connections between all nodal computers in an (n−1)-dimensional space. For a technical realization in three-dimensional space, a projection into the three-dimensional space must be calculated algorithmically from the known topological relations of a permutograph. The projection results of course in connections of varying length between the individual nodal computers. Precisely these properties are also observed in the network of the formatio reticularis. This means that by skillful organization the multidimensionality can be converted into three-dimensionality.

Figure 1:
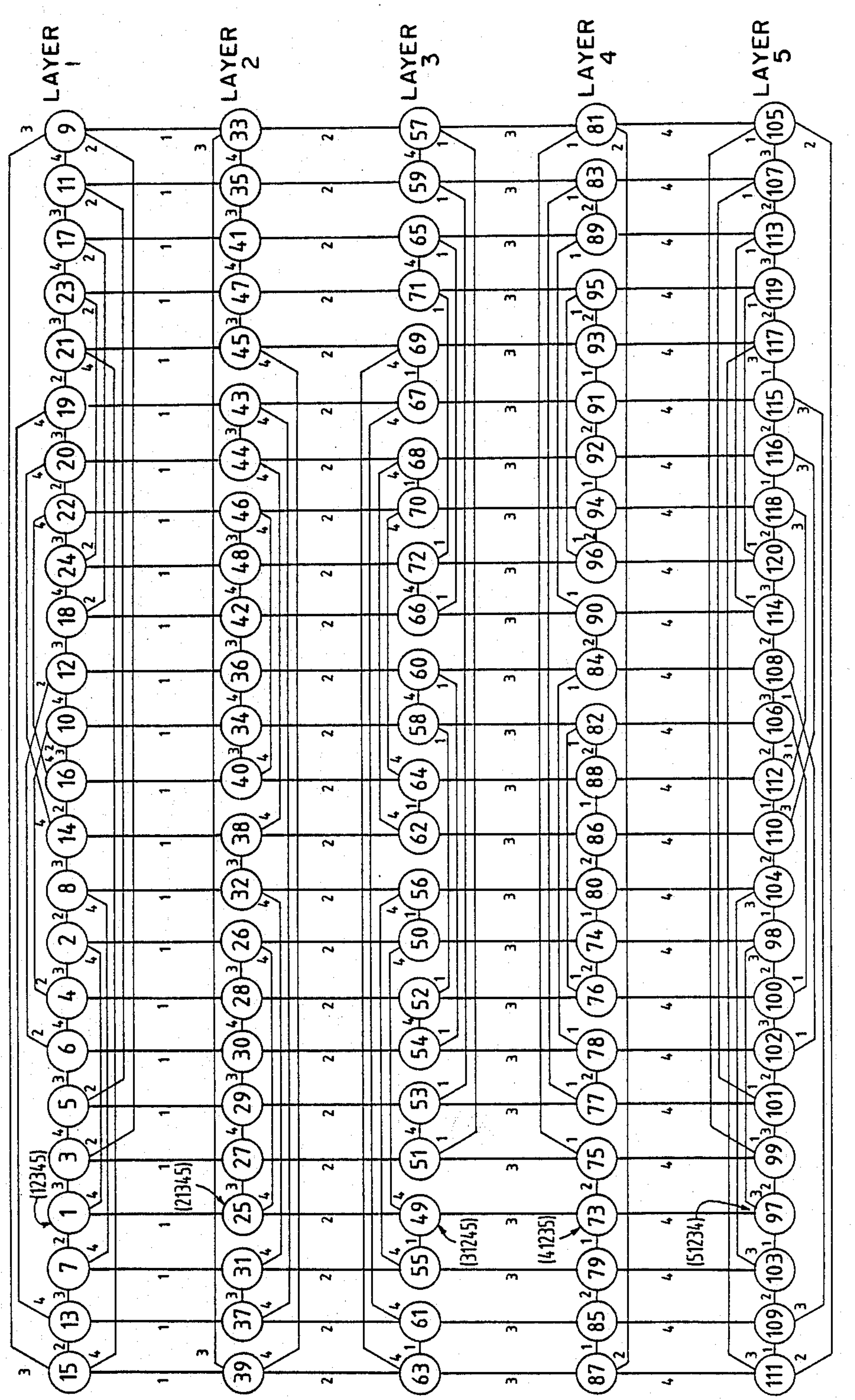

Such an algorithm is initially known only for permutographs with linear cotexture. This leads, as mentioned above, to an arrangement of the nodal computers in individual layers. In the case of linear permutographs, a complete linear permutograph of the order (n−1) corresponds in turn to the first and last layers, i.e. the edge layers. If an arrangement of nodes is found for one of the edge layers, this is at the same time the spatial arrangement for the nodes of the other layers. This is clearly indicated by FIGS. 1 and 2, in which the numbers (stated in the circles) of the nodal computers of one layer are each greater by 24 or 6 than in the preceding layer. The edge layers have the most complex order. The intermediate layers have subsystem orders of the edge layers.

In order to find the arrangement of the nodal computers of the arrangement decisive for the overall construction, one resorts recursively to permutographs for a lower order until one hits permutographs with a known three-dimensional projection. For a pentavalent system there is already a three-dimensional model as a projection out of four-dimensional space.

The final crosslinking of the individual nodal computers and the subnodal unit takes place as follows. Any nodal computer that is still "empty" is singled out as the first cell. Without restricting the generality, let this be the nodal computer with the lexicographic order number (1). The intrinsic permutation of the nodal computer is written into this first cell via an appropriate read-write apparatus, i.e. the permutation (1, 2, 3, 4) in the case of a simple computer as in FIG. 2. In this way the valency is reported to the resulting nodal computer and also to the total computer. In general the valency will correspond to the valency conceived for the total system, but it may also be lower. Next, the permissible exchange relations, i.e. the negators, are inputted to contexture computer 24 with the n-location contexture cell. In the tetravalent system dealt with here, these are negators $N_1$, $N_2$ and $N_3$, which exchange the values 1 and 2, 2 and 3 and 3 and 4, respectively. Since $$\binom{n}{2}$$

compound lines exist in the contexture computer which can connect each of the n values with each other one, the stated exchange relations are now realized by switching on the corresponding compound lines, thereby defining the permissible negators.

Since the algorithm "shortest path" is built into each nodal computer in step memory 35, the lexicographic order numbers of target permutations can also be calculated, which are then deposited in target memory 36. In successive steps the n-digit vector $P_E$ is copied into the vector $P_{target}$ via a parallel connection from the nodal computer serving as the first cell. Negator $N_i$ is then applied in step i in the vector $P_{target}$ in accordance with the present linear contexture, i.e. two values of the original permutation $P_E$ representing the address are exchanged or transposed. The permutation applied to the address vector determines the lexicographic order number of the built-in algorithm "shortest path." On the basis of this calculation a connecting line corresponding to negation lines 32 is established from the nodal computer serving as the first cell to $(n-1)$ further nodal computers. The number of negation lines follows from the permutations applied to the address vector.

One after the other, the $(n-1)$ further nodal computers connected to the nodal computer serving as the first cell are now subjected to the same procedure. This gives rise to further connections with further nodal computers. The process described here is repeated until all n! nodal computers are crosslinked. This is terminated after $$\binom{n}{2}$$

such procedures. The stated crosslinking procedure is of course also preformed in subnodal unit 26.

Finally, the total system is provided with a predetermined contexture which is the same for all nodal computers. The total permutograph, which may serve the logic, the intrinsic organization, the ontogenesis for reproducing further computers of the same construction, and also determines the memory structure, is now crosslinked.

Up to now a total computer has been described in which the nodal computers are interconnected by $(n-1)$ negation lines. However, it is also possible to construct a computer in which this number of negation lines is higher. This is made possible in FIG. 3 by an additional combinatorial circuit 49 shown by dotted lines. In this case each nodal computer can be linked with other nodal computers via $$\binom{n}{2}$$

lines. These $$\binom{n}{2}$$

additional connecting lines may be switched "on" or "off". Thus, each nodal computer can have its own contexture, although it must be compatible with the contextures of the other nodal computers. Furthermore, each adjusted contexture can thus be readjusted if required—even during operation—so that variable contexture can be used. However, the necessitates previous compatibility calculations, which the computer can perform itself.

A computer expanded in this fashion can also be used to regulate other computers—even of a different order or valency—with a smaller order or else a higher order. If the regulated computer has a higher order, however, only subsystems of this computer can be regulated.

For further explanation of the intentional function of the computer reference is again made to the above-mentioned German "offenlegungsschrift" No. 34 29 078.

Regardless of whether the described computer is used, for example, as a switching computer (for qualitatively different areas), as a control computer for robots, as a coordination computer for different conventional digital computers, as a simulator of complex crosslinked control loop systems, as an analysis computer for properties of self-referential systems, or as a development computer for further transclassic computers developed more highly than it itself, the information elements of the switching are always words of the negative language. The words may be negation sequences with a statement of the initial permutation in case one operation takes place at a time in the total system, or flows in networks in the case of several operations taking place at the same time.

These words are not accessed; they are generated according to the negation network of the basic permutograph. If important words already generated are to be used for some purpose without any new construction because, for example, the construction effort is greater than the documentation effort, an external classic storage medium can be connected to fix the run of a certain word. Since each individual nodal computer jointly calculates what is happening in the total system, each of them can in principle function as an output system.

Different output systems can also exist alongside one another; this also depends on the application the computer is being used for:

A. Simplest task: nodal computer pulses

Each nodal computer is characterized by its physical location with its intrinsic permutation and provides as many distinct signals as it can be activated via negation lines 22, 32.

This allows for direct control of external systems.

For more complex tasks, a memory system that operates classically, i.e. documents binary sequences, can collect the pulses of the nodal computers in the order of their occurrence and store them up to the capacity limit, since this documentation revolves around the bivalent principle "present/absent".

B. Network displays

Any nodal computer is assigned the task of externally switching the computer-internal negative language activities of the total computer. For this purpose a material, but only topologically similar copy of the negation network skeleton is required. All information flows or calculations are displayed thereon. It is possible to regulate how many successive operations are to be displayed before the first arrivals are deleted. This means a floating operation sequence.

The selected nodal computer can fulfil this task if pulse receivers are connected to its own nodules in which the total computer situation is jointly calculated. This output function does not impair its function as an element of the total computer. A nodal computer switches the total situation in this case. In output system A it is the total computer.

C. Subsystem output

Any nodal computer may also serve as an indicator for subsystem relations, shortest paths, Hamilton loops, i.e. maximum loops, etc. In this case the corresponding permutations and negators for the above-mentioned subsystems are permanently displayed in a special output unit—again a replica of the permutograph.

These words of the negative language represented via the output units can then, for example, be differentiated commands for connected robots, or else state orders according to which several robots must cooperate in order to produce a jointly processed product.

Since the computer is conceived in such a way that self-controlling cycles of varying physical duration come about for computing processes, the problem of minimum durations or computing times is not only dependent on line lengths but is always a space-time problem that is in turn dependent on the formation process itself.

If a control process requires not only minimum step sequences but also that the path go over as many shortest lines as possible, path processor 25 can also calculate such paths in a much shorter time than is possible in general graphs with the best algorithms for the so-called "travelling saleman's problem." The quickness of the path processor results, on the one hand, from the unique organization of the computer network and, on the other hand, from the fact that in permutographs all shortest paths can in principle be obtained from the knowledge of just one via simple negative language operations. Such shortest paths with a maximum number of minimum line lengths can also be stored in a conventional memory.

We claim:

1. A computer for simulating complex processes, comprising:

a computer input system means for inputting information to the computer;

logic/computing system means for receiving and for processing said inputted information, said logic/computing system means constructed as a negation network forming an n-valent permutograph, where n is a positive integer;

said permutograph including nodes formed by n! nodal computers and edges formed by information lines connecting said nodal computers to each other, each nodal computer having an input unit connected to a computer control means, a contexture computer, a path processor and a subnodal unit and further having associated therewith an address corresponding to a permutation of n values;

wherein said information lines proceed from each nodal computer and lead to a different nodal computer whose address is obtained from a negator ($N_i$) in accordance with an exchange of two values of the original address, so that each information line is associated with a certain negator;

wherein each contexture computer is activated via a respective input unit and includes a memory cell with n storage locations for the values 1 to n, each storage location being connected with all other storage locations so that said values can be exchanged between them, said contexture computer calculating from data input from said input unit a contexture signal corresponding to a negator ($N_i$), said contexture signal being transmitted to connected nodal computers and a respective subnodal unit via associated information lines;

wherein each path processor is activated via a respective input unit and includes a path length computer with a step memory for calculating and storing, respectively, the smallest number of steps to a target nodal computer, a path length, counter, a negation sequence computer for calculating the associated information lines necessary for reaching said target nodal computer, and a line switch activator acted upon by the negation sequence computer for activating the information line associated with the calculated negator ($N_i$);

each information line including a line switch which can be activated by a threshold switch with a modulo $$\binom{n}{2}$$

output designed as a step counter and by said path processor;

wherein each subnodal unit is constructed of n! subnodes designed as activatable modules which are each assigned a permutation of the n values as an address, and which are interconnected in the manner of said permutograph in accordance with the crosslinking structure of the total computer; and a computer output system means for receiving and for outputting said processed information.

2. A computer as set forth in claim 1 wherein:

(n−1) information lines connect each nodal computer to other nodal computers whose address is obtained with the aid of said negator ($N_i$) by exchanging two numerically successive values.

3. A computer as set forth in claim 2 wherein:

said n! nodal computers are arranged in n layers with (n−1) nodal computers in each layer, the first value (1, 2, . . . n) being constant in each layer within the addresses of the nodal computers, and said layers are arranged according to an ascending sequence of the first values.

4. A computer as set forth in claim 3 wherein said path processor of each nodal computer includes:

a maximum counter which is connected with said step counters of said threshold indicators, said maximum counter holding the contents of the particular step counter with the highest counter reading, and wherein the output of the maximum counter is connected with said line switch activator which, when said negation sequence computer states several possible negators ($N_i$), activates the respective information line whose step counter has the highest counter reading.

5. A computer as set forth in claim 4 wherein:

at least one of said nodal computers has an inspection program control means for checking the total functioning of the computer, and certain paths through all or a selected portion of said nodal computers.

6. A computer as set forth in claim 3 wherein:

at least one of said nodal computers has an inspection program control means for checking the total functioning of the computer, and certain paths through all or a selected portion of said nodal computers.

7. A computer as set forth in claim 2 wherein said path processor of each nodal computer includes:

a maximum counter which is connected with said step counters of said threshold indicators, said maximum counter holding the contents of the particular step counter with the highest counter reading, and wherein the output of the maximum counter is connected with said line switch activator which, when said negation sequence computer states several possible negators ($N_i$), activates the respective information line whose step counter has the highest counter reading.

8. A computer as set forth in claim 7 wherein:

at least one of said nodal computers has an inspection program control means for checking the total functioning of the computer, and certain paths through all or a selected portion of said nodal computers.

9. A computer as set forth in claim 2 wherein:

at least one of said nodal computers has an inspection program control means for checking the total functioning of the computer, and certain paths through all or a selected portion of said nodal computers.

10. A computer as set forth in claim 1 wherein:

said n! nodal computers are arranged in n layers with (n−1) nodal computers in each layer, the first value (1, 2, . . . n) being constant in each layer within the addresses of the nodal computers, and said layers are arranged according to an ascending sequence of the first values.

11. A computer as set forth in claim 10 wherein said path processor of each nodal computer includes:

a maximum counter which is connected with said step counters of said threshold indicators, said maximum counter holding the contents of the particular step counter with the highest counter reading, and wherein the output of the maximum counter is connected with said line switch activator which, when said negation sequence computer states several possible negators ($N_i$), activates the respective information line whose step counter has the highest counter reading.

12. A computer as set forth in claim 11 wherein:

at least one of said nodal computers has an inspection program control means for checking the total functioning of the computer, and certain paths through all or a selected portion of said nodal computers.

13. A computer as set forth in claim 10 wherein:

at least one of said nodal computers has an inspection program control means for checking the total functioning of the computer, and certain paths through all or a selected portions of said nodal computers.

14. A computer as set forth in claim 1 wherein said path processor of each nodal computer includes:

a maximum counter which is connected with said step counters of said threshold indicators, said maximum counter holding the contents of the particular step counter with the highest counter reading, and wherein the output of the maximum counter is connected with said line switch activator which, when said negation sequence computer states several possible negators ($N_i$), activates the respective information line whose step counter has the highest counter reading.

15. A computer as set forth in claim 14 wherein:

at least one of said nodal computers has an inspection program control means for checking the total functioning of the computer, and certain paths through all of a selected portion of said nodal computers.

16. A computer as set forth in claim 1 wherein:

at least one of said nodal computers has an inspection program control means for checking the total functioning of the computer, and certain paths through all or a selected portion of said nodal computers.

17. A computer as set forth in any one of claims 1–16 or 3–5 wherein:

said nodal computers can be crosslinked with other nodal computers with the aid of an additional combinatorial circuit via $$\binom{n}{2}$$

information lines in each case, said other nodal computers being switched on or off with the aid of said contexture computer.

* * * * *